(12) United States Patent
Dempo et al.

(10) Patent No.: US 6,930,986 B2
(45) Date of Patent: Aug. 16, 2005

(54) BASE STATION APPARATUS AND COMMUNICATION METHOD

(75) Inventors: Hiroshi Dempo, Tokyo (JP); Noritaka Matsuura, Tokyo (JP)

(73) Assignee: NEC Corporation, Tokyo (JP)

( * ) Notice: Subject to any disclaimer, the term of this patent is extended or adjusted under 35 U.S.C. 154(b) by 908 days.

(21) Appl. No.: 09/749,772

(22) Filed: Dec. 28, 2000

(65) Prior Publication Data

US 2001/0005677 A1 Jun. 28, 2001

(30) Foreign Application Priority Data

Dec. 28, 1999 (JP) ............................................. 11-373684

(51) Int. Cl.$^7$ ................................................. H04B 7/00
(52) U.S. Cl. ..................... 370/310.2; 370/331; 455/427
(58) Field of Search .............................. 370/310, 310.1, 370/310.2, 315, 316, 325, 328, 329, 331, 395.1; 455/422.1, 427, 428, 431

(56) References Cited

U.S. PATENT DOCUMENTS

| | | | |
|---|---|---|---|
| 5,995,833 A | | 11/1999 | Zicker |
| 6,314,286 B1 | * | 11/2001 | Zicker ......................... 455/431 |
| 6,324,398 B1 | * | 11/2001 | Lanzerotti et al. ........... 455/431 |
| 6,345,186 B1 | * | 2/2002 | Schultz et al. ............... 455/441 |

FOREIGN PATENT DOCUMENTS

| | | |
|---|---|---|
| EP | 0 577 960 | 1/1994 |
| EP | 0 749 261 | 12/1996 |
| EP | 0 823 827 | 2/1998 |
| EP | 0 898 434 | 2/1999 |
| EP | 0 936 829 | 8/1999 |
| JP | 6244780 | 9/1994 |
| JP | 07-46248 | 2/1995 |
| JP | 984126 | 3/1997 |
| JP | 9121188 | 5/1997 |
| JP | 10-308749 | 11/1998 |
| JP | 11234736 | 8/1999 |
| WO | 97/42779 | 11/1997 |
| WO | 98/47302 | 10/1998 |

OTHER PUBLICATIONS

Personal Handy Phone System ARIB Standard Version 3, RCR STD–28 issued by the ARIB (the Association of Radio Industries and Businesses), pp. 436–446.

* cited by examiner

Primary Examiner—Bob A. Phunkulh
(74) Attorney, Agent, or Firm—Young & Thompson

(57) ABSTRACT

A base station apparatus for communicating with a specific base station and with a terminal that can move relative to the specific base station. The base station apparatus is provided to be able to move relative to the specific base station, and when the terminal has moved relative to the specific base station, the base station apparatus moves relative to the specific base station substantially in the same direction as the move direction of the terminal.

32 Claims, 6 Drawing Sheets

BASE STATION APPARATUS AND COMMUNICATION METHOD

BACKGROUND OF THE INVENTION

1. Field of the Invention

The present invention relates to a base station apparatus and a communication method.

2. Description of the Related Art

According to a conventional mobile communication network, a hand-over processing has been carried out at each terminal as move directions of terminals are not uniform and are in various directions. In this case, hand-over processing information has been transmitted between a terminal and a base station through a radio channel that is used for control information between the terminal and the base station. A radio channel for the control information has been prescribed by, for example, the ITU-T recommendation Q.1063 Digital PLMN Channel Structures and Access Capabilities at the Radio Interface (Um Reference Point).

According to this recommendation, radio channels are broadly classified into a traffic channel (TCH) for transmitting user data by radio, and a control channel (CCH) for transmitting control information by radio. As the information transmitted during a hand-over is the control information, this control information is transmitted by radio using the latter CCH. Based on the information to be transmitted, the CCH is further divided into an associated control channel (ACCH), a dedicated control channel (DCCH), a common control channel (CCCH), a broadcast control channel (BCCH), and a user packet channel (UPCH). Applications of these control channels will not be particularly explained here.

Next, according to Personal Handy Phone System ARIB Standard Version 3, RCR STD-28, issued by the ARIB (the Association of Radio Industries and Businesses), it is described that the control information for the hand-over processing is transmitted by radio using the ACCH. The ACCH is further divided Into a slow associated control channel (SACCH), and a fast associated control channel (FACCH). The control information for the hand-over processing is transmitted by radio using the SACCH.

As an example of a hand-over processing carried out at each terminal according to the prior-art technique, a hand-over processing in a personal handy phone system (PHS) is described in Personal Handy Phone System ARIB Standard Version 3, RCR STD-28 (the second generation cordless telephone system standards, Version 3, Fascicle 1), issued by the ARIB (the Association of Radio Industries and Businesses). According to the conventional mobile communication network, where there are various directions in the move of terminals, hand-over destinations and hand-over executing timings are different between the terminals. As a result, according to the conventional technique, each terminal executes the hand-over processing.

FIG. 1 shows an outline of the hand-over processing described in Personal Handy Phone System ARIB Standard Version 3, RCR STD-28 (the second generation cordless telephone system standards, Version 3, Fascicle 1), issued by the ARIB (the Association of Radio Industries and Businesses).

When a certain mobile station (corresponding to a terminal in embodiments to be described later) 600 is going to move from a service area that is managed by a certain base station (corresponding to a fixed base station in the embodiments to be described later) 700 to another service area managed by the same base station 700, the mobile station 600 transmits a link channel establishment request 800 to this base station 700. Upon receiving this link channel establishment request 800, the base station 700 allocates a radio link channel of a hand-over destination to this mobile station 600, and notifies a result of this allocation to this base station 700 as a link channel allocation 810.

When this radio link channel of a hand-over destination has been allocated to the mobile station 600, the mobile station 600 transmits a call setup 820 to the base station 700. Upon receiving the call setup 820, the base station 700 carries out a call connection processing at the hand-over destination.

In the case of accepting a call corresponding to the call setup 820, the base station 700 posts a call setup acceptance 830 to the mobile station 600. In response to this call setup acceptance 830, the mobile station 600 that has finished the call setup processing notifies an authentication request 840 to the base station 700. The base station 700 confirms whether this mobile station 600 is a correct mobile station or not, based on the authentication request 840. The base station 700 then notifies a result of this authentication to the mobile station 600 as an authentication response 850.

The mobile station 600 that has been authenticated as shown in the authentication response 850 by the base station 700 notifies a radio channel disconnection 860 to the base station 700 in order to disconnect the link before the hand-over. The base station 700 that has received the radio channel disconnection 860 releases the setting of this mobile station 600 before the hand-over, and notifies this effect to the mobile station 600 as a radio channel disconnection completion 870.

As explained above, according to the existing mobile communication system, a hand-over processing is carried out for each terminal 600.

In actual practice, there is considered a case where many terminals move in the same direction at the same time. For example, there is a case where passengers on a train or on an airplane are carrying out communications using their mobile terminals. When a plurality of terminals within a service area of a certain base station have moved to the same direction together, the plurality of terminals start a hand-over processing using respective SACCHs. As a result, the control information between the terminal, the base station and the exchange increases rapidly because of the hand-over processing. This has had a problem that the load of the network becomes high.

According to the existing mobile communication system (including a PHS system shown in the embodiments of the present invention to be described later), various control information has been necessary in addition to the user data. The control information is classified into a plurality of types based on the kinds of the control information. Radio channels for transmitting data are allocated on that classification basis. In other words, as described above, the CCH through which the control information is transmitted includes the ACCH, DCCH, CCCH, BCCH, and UPCH that are allocated to the plurality of corresponding kinds of control information. The transmission of the control information at the time of the hand-over processing is carried out using the SACCH out of the SACCH and the FACCH that are the sub-divisions of the ACCH.

In the radio communication, the transmission band is limited as compared with that or the wire communication. Therefore, there has been a particularly high demand for the effective utilization of the transmission band for the radio communication. The allocation of a separate radio channel to each kind of the control information with one classified channel (each of the above-described plurality of kinds of channels) used as one unit does not contribute to the effective utilization of the transmission band.

According to Japanese Patent Application Laid-open Publication No. Hei 9-121188, the following mobile communication system (prior-art technique 1) has been disclosed. According to the prior-art technique 1, in the mobile communication system that cannot manage the hand-over processing during a high-speed moving like the PHS, a mobile base station and a relay station are installed within a high-speed moving unit for providing a communication service during a high-speed moving. A PHS terminal is connected to an ISDN through the mobile base station, the relay station, a base station and an exchange.

According to the existing mobile communication system (including the PHS), the radio channels for the control information exist as described above. Therefore, in order to effectively utilize the limited radio transmission band (the radio channels), a further ingenuity is required.

According to Japanese Patent Application Laid-open Publication No. Hei 11-234736, the following mobile communication system (prior-art technique 2) has been disclosed. The prior-art technique 2 consists of an existing base station for managing a fixed radio control zone covering a predetermined area, a mobile base station for managing a moving radio control zone that has been allocated to an internal space of a moving vehicle, and a mobile station. The mobile base station has first communication means for carrying out a communication processing as a mobile station between the mobile base station and the existing base station, second communication means for carrying out a communication processing as a base station between the mobile base station and the mobile station within the moving radio control zone, and mobile base station control means for carrying out a connection control of a path between the first communication means and the second communication means. The first communication means has a plurality of control channels between the mobile base station and the existing base station, and sequentially carries out a perch scanning starting from a control channel that has become unused.

According to the prior-art technique 2, a plurality of control channels are used (allocated) in a limited radio transmission band (radio channels). Therefore, it is not possible to effectively utilize the radio transmission band (the radio channels).

According to Japanese Patent Application Laid-open Publication No. Hei 9-84126, the following mobile communication system (prior-art technique 3) has been disclosed. The prior-art technique 3 comprises a plurality of base stations, each being connected to a public communication network via a wired channel and forming one of a group of first cells of a predetermined size along a moving path of a high-speed moving vehicle, at least one relay station that forms on the high-speed moving vehicle a second cell being smaller than the first cell, and a moving unit that can move at a low speed on the high-speed moving vehicle. The relay station and the moving unit have a first radio interface for connecting between the moving unit and the relay station via a first radio channel during a communication of the moving unit. The base stations and the relay station have a second radio interface for connecting between the base stations and the relay station via a second radio channel cooperatively with the connection operation of the first radio interface via the first radio channel, and for connecting this second radio channel with the first radio channel, and base station hand-over means for switching over between the base stations that become connection destinations of the relay station while holding the first radio channel when the high-speed moving vehicle moves between the first cells.

The relay station has a relay transceiver exclusively used for the control channels, and a separate relay transceiver exclusively used for the communication channels.

According to the prior-art technique 3, there are radio channels exclusively used for the control channels. Therefore, it is not possible to effectively utilize the radio transmission band (the radio channels) by this portion.

According to Japanese Patent Application Laid-open Publication No. Hei 6-244780, the following mobile communication method (prior-art technique 4) has been disclosed. The prior-art technique 4 has a mobile radio communication system comprising a plurality of base stations, a large number of mobile stations that can be connected to these base stations via radio channels, and a control station for controlling the plurality of base stations. The control station has memory means for registering, for each mobile station, one or more base stations that should page the mobile station, means for updating the registered contents of the memory means as the mobile stations move, and means for controlling so that the paging of the mobile stations is executed by the base stations registered in the memory means. In this mobile radio communication system, means for relay connecting between the mobile stations and the control station via the base stations is mounted on a moving vehicle. The mobile stations have means for connecting to the relay connecting means. The relay connecting means has means for registering the mobile stations connected by the means for connecting, means for notifying subscriber numbers of the registered mobile stations and position information of the relay connecting means to the control station via the base stations, and means for relay connecting the connection control and communication of the registered mobile stations.

The means for connecting has means for connecting by using relay control channels different from the control channels of the base stations.

According to the prior-art technique 4, in addition to the control channels, there are the relay control channels. Therefore, it is not possible to effectively utilize the radio transmission band (the radio channels) by this portion.

Therefore, it has been required to decrease the volume of control information during the hand-over processing. Further, it has been required to effectively utilize the limited radio transmission band (the radio channels).

SUMMARY OF THE INVENTION

In the light of the above situation, it is an object of the present invention to provide a base station apparatus and a communication method capable of decreasing the volume of control information during the hand-over processing.

Further, in the light of the above situation, it is another object of the present invention to provide a base station apparatus and a communication method capable of effectively utilizing the limited radio transmission band (the radio channels).

Means for solving the problems are described below. In the following description, reference numbers and symbols are attached in brackets to technical items that correspond to those in the claims of the invention. These reference numbers and symbols make clear the coincidence and correspondence between technical items in the claims and technical items in at least one of a plurality of embodiments. This does not mean, however, that the technical items in the claims are limited to the technical items in these embodiments.

According to a first aspect of the present invention, there is provided a base station apparatus (100) for communicating with a specific base station (200) and with a terminal (301) that can move relative to the specific base station (200), wherein the base station apparatus (100) is provided to be able to move relative to the specific base station (200), and when the terminal (301) has moved relative to the specific base station (200), the base station apparatus (100) moves relative to the specific base station (200) substantially in the same direction as the move direction of the terminal (301).

Further, according to a second aspect of the present invention, there is provided a base station apparatus (100) of the above-described aspect, wherein the base station apparatus (100) communicates with the specific base station (200) and the terminal (301) respectively according to the ATM (asynchronous transfer mode) communication system in which user data and control information are allocated to ATM cells without distinction between the user data and the control information.

Further, according to a third aspect of the present invention, there is provided a base station apparatus (100) of the above-described aspect, wherein the user data is data that is transmitted through a traffic channel, and the control information is information that is transmitted through a control channel.

Further, according to a fourth aspect of the present invention, there is provided a base station apparatus (100) of the above-described aspect, wherein when the base station apparatus (100) communicates with the specific base station (200) and the terminal (301), respectively, unique VPI (virtual path identifier) and VCI (virtual channel identifier) that indicate that the ATM cell includes the control information are assigned to the ATM cell that includes the control information.

Further, according to a fifth aspect of the present invention, there is provided a base station apparatus (100) of the above-described aspect, wherein the base station apparatus (100) has a specific base station interface section (110) and a base station control section (140), the specific base station interface section (110) carries out a radio communication with the specific base station (200), generates a used-channel reception status signal that indicates a reception status of a channel that is being used between the specific base station (200) and the base station apparatus (100) and an unused-channel reception status signal that indicates a reception status of a second channel different from the channel that is being used, and outputs these signals to the base station control section (140), and the base station control section (140) makes a decision as to whether a hand-over is to be carried out or not, based on the used-channel reception status signal and the unused-channel reception status signal, and selects a service area to which the hand-over is to be carried out when a decision has been made that the hand-over is to be carried out.

Further, according to a sixth aspect of the present invention, there is provided a base station apparatus (100) of the above-described aspect, wherein the base station apparatus (100) further has a terminal interface section (120), a VPI (virtual path identifier) conversion section (130), and a VPI database section (150); the VPI database section (150) stores VPI data; the specific base station interface section (110) extracts ATM cells from a reception frame received from the specific base station (200) as first ATM cells, outputs the first ATM cells to the VPI conversion section (130), maps ATM cells input from the VPI conversion section (130) into a transmission frame as second ATM cells, and transmits the transmission frame to the specific base station (200); the terminal interface section (120) communicates with the terminal (301), extracts ATM cells from a reception frame received from the terminal (301) as third ATM cells, outputs the third ATM cells to the VPI conversion section (130), maps ATM cells input from the VPI conversion section (130) into a transmission frame as fourth ATM cells, and transmits the transmission frame to the terminal (301); the VPT conversion section (130) refers to the VPI data stored in the VPI database (150), converts the VPI data of the input first ATM cells and outputs a result to the terminal interface section (120), converts the VPI data of the input third ATM cells and outputs a result to the fixed base station interface section (110); and the mobile base station control section (140) outputs the converted VPI data to the VPI database (150).

Further, according to a seventh aspect of the present invention, there is provided a base station apparatus (100) of the above-described aspect, wherein when the terminal (301) moves from a first service area (0) to a second service area (1) of the specific base station (200), the base station apparatus (100) carries out a hand-over processing of the terminal (301) in place of the terminal (301).

Further, according to an eighth aspect of the present invention, there is provided a base station apparatus (100) of the above-described aspect, wherein the base station apparatus (100) communicates with a plurality of specific base stations (200), and when the terminal (301) moves from a first service area (0) to a first specific base station (200) among the plurality of specific base stations (200) to a second service area (1) of a second specific base station (200) among the plurality of specific base stations (200), the base station apparatus (100) carries out a hand-over processing of the terminal (301) in place of the terminal (301).

Further, according to a ninth aspect of the present invention, there is provided a base station apparatus (100) of the above-described aspect, wherein when a plurality of terminals (301) move from the first service area (0) to the second service area (1), the base station apparatus (100) carries out a hand-over processing of the plurality of terminals (301) by treating them collectively as one unit.

Further, according to a tenth aspect of the present invention, there is provided a base station apparatus (100) of the above-described aspect, wherein the base station apparatus (100) is installed in transporting means that transports a user of the terminal (301).

Further, according to an eleventh aspect of the present invention, there is provided a base station apparatus (100) of the above-described aspect, wherein the specific base station (200) is fixedly provided on the ground or is fixed relative to the ground surface.

Further, according to a twelfth aspect of the present invention, there is provided a communication system equipped with a specific base station (200), a terminal (301) that can move relative to the specific base station (200), and a base station apparatus (100) for communicating with the specific base station (200) and the terminal (301), wherein the base station apparatus (100) is provided to be able to move relative to the specific base station (200), and when the terminal (301) has moved relative to the specific bass station (200), the base station apparatus (100) moves relative to the specific base station (200) substantially in the same direction as the move direction of the terminal (301).

Further, according to a thirteenth aspect of the present invention, there is provided a communication system of the above-described aspect, wherein the base station apparatus (100) communicates with the specific base station (200) and the terminal (301) respectively according to an ATM (asynchronous transfer mode) communication system in which user data and control information are allocated to ATM cells without distinction between the user data and the control information.

Further, according to a fourteenth aspect of the present invention, there is provided a communication system of the above-described aspect, wherein when the base station apparatus (100) communicates with the specific base station (200) and the terminal (301), respectively, unique VPI (virtual path identifier) and VCI (virtual channel identifier) that indicate that the ATM cell includes the control information are assigned to the ATM cell that includes the control information.

Further, according to a fifteenth aspect of the present invention, there is provided a communication system of the above-described aspect, wherein the base station apparatus (100) has a specific base station interface section (110) and a base station control section (140), the specific base station interface section (110) carries out a radio communication with the specific base station (200), generates a used-channel reception status signal that indicates a reception status of a channel that is being used between the specific base station (200) and the base station apparatus (100) and an unused-channel reception status signal that indicates a reception status of a second channel different from the channel that is being used, and outputs these signals to the base station control section (140), and the base station control section (140) makes a decision as to whether a hand-over is to be carried out or not, based on the used-channel reception status signal and the unused-channel reception status signal, and selects a service area to which the hand-over is to be carried out when a decision has been made that the hand-over is to be carried out.

Further, according to a sixteenth aspect of the present invention, there is provided a communication system of the above-described aspect, wherein the base station apparatus (100) further has a terminal interface section (120), a VPI (virtual path identifier) conversion section (130), and a VPI database section (150); the VPI database section (150) stores VPI data; the specific base station interface section (110) extracts ATM cells from a reception frame received from the specific base station (200) as first ATM cells, outputs the first ATM cells to the VPI conversion section (130), maps ATM cells input from the VPI conversion section (130) into a transmission frame as second ATM cells, and transmits the transmission frame to the specific base station (200); the terminal interface section (120) communicates with the terminal (301), extracts ATM cells from a reception frame received from the terminal (301) as third ATM cells, outputs the third ATM cells to the VPI conversion section (130), maps ATM cells input from the VPI conversion section (130) into a transmission frame as fourth ATM cells, and transmits the transmission frame to the terminal (301); the VPI conversion section (130) refers to the VPI data stored in the VPI database (150), converts the VPI data of the input first ATM cells and outputs a result to the terminal interface section (120), converts the VPI data of the input third ATM cells and outputs a result to the fixed base station interface section (110); and the mobile base station control section (140) outputs the converted VPI data to the VPI database (150).

According to a communication system of the present invention, the base station apparatus (100) communicates with the specific base station (200) and the terminal (301) respectively in the ATM (asynchronous transfer mode).

Further, according to a seventeenth aspect of the present invention, there is provided a communication system of the above-described aspect, wherein when the terminal (301) moves from a first service area (0) to a second service area (1) of the specific base station (200), the base station apparatus (100) carries out a hand-over processing of the terminal (301) in place of the terminal (301).

Further, according to an eighteenth aspect of the present invention, there is provided a communication system of the above-described aspect, wherein the base station apparatus (100) communicates with a plurality of specific base stations (200), and when the terminal (301) moves from a first service area (0) of a first specific base station (200) among the plurality of specific base stations (200) to a second service area (1) of a second specific base station (200) among the plurality of specific base stations (200), the base station apparatus (100) carries out a hand-over processing of the terminal (301) in place of the terminal (301).

Further, according to a nineteenth aspect of the present invention, there is provided a communication system of the above-described aspect, wherein when a plurality of terminals (301) move from the first service area (0) to the second service area (1), the base station apparatus (100) carries out a hand-over processing of the plurality of terminals (301) by treating them collectively as one unit.

Further, according to a twentieth aspect of the present invention, there is provided a communication system of the above-described aspect, wherein the base station apparatus (100) is installed in transporting means that transports a user of the terminal (301).

Further, according to a twenty-first aspect of the present invention, there is provided a communication system of the above-described aspect, wherein the specific base station (200) is fixedly provided on the ground or is fixed relative to the ground surface.

Further, according to a twenty-second aspect of the present invention, there is provided a communication method comprising the steps of: (a) providing first and second service areas (0, 1) by a first base station (200); (b) providing a second base station (100) having a third service area (10); (c) installing the second base station (100) so that the third service area (10) is superimposed on the first service area (0); (d) when a plurality of terminals (301) move from the first service area (0) to the second service area (1), moving the second base station (100) so that the third service area (10) covers the moved plurality of terminals (301); (e) the second base station (100) collectively generating for the plurality of terminals (301) first data necessary for a hand-over processing associated with the move of the plurality of terminals (301) from the first service area (0) to the second service area (1), on behalf of the plurality of terminals (301), and outputting the generated first data to the first base station (200); and (f) the first base station (200) collectively generating for the plurality of terminals (301) second data necessary for the hand-over processing of the plurality of terminals (301) in response to the input first data, and outputting the generated second data to the second base station (100).

Further, according to a twenty-third aspect of the present invention, there is provided a communication method of the above-described aspect, wherein at step (e), the second base station (100) outputs the generated first data in the ATM (asynchronous transfer mode), and at step (f), the first base station (200) outputs the generated second data to the second base station in the ATM.

Further, according to a twenty-fourth aspect of the present invention, there is provided a communication method or the above-described aspect, wherein the hand-over processing is carried out only between the first terminal (100) and the second terminal (200) on behalf of the plurality of terminals (301).

According to a mobile communication network of the present invention, the mobile communication network has one fixed base station installed at a certain point on the ground or one fixed base station (200) equipped with a base station function within a stationary satellite fixed relative to the ground surface. Within this network, the fixed base station (200) has one or more areas to which a radio wave reaches therefrom. The one or more areas are set as service areas. Within the one or more service areas, there exists one or a plurality of terminals (301 to 30n). The mobile communication network has a mobile base station (100) that carries out a wire communication or a radio communication with the plurality of terminals (301 to 30n) when these terminals collectively move at the same time in a small area from one service area (0) to another service area (1). The mobile base station (100) has a function of carrying out a radio communication with the fixed base station (200) using the small area in which the plurality of terminals (301 to 30n) exist as a service area, in the case of carrying out a radio communication with the plurality of terminals (301 to 30n). Further, the mobile base station (100) can move in the same direction in which the plurality of terminals (301 to 30n) move.

Further, according to a mobile communication network of the present invention, the mobile communication network has a plurality of fixed base stations each installed at a certain point on the ground or a plurality of fixed base stations (200a, 200b) each equipped with a base station function within a stationary satellite fixed relative to the ground surface. Within this network, each of the plurality of fixed base stations (200a, 200b) has one or more areas to which a radio wave reaches therefrom. The one or more areas are set as service areas. Within the one or more service areas, there exists one or a plurality of terminals (301 to 30n). The mobile communication network has a mobile base station (100) that carries out a wire communication or a radio communication with the plurality of terminals (301 to 30n) when these terminals collectively move at the same time in a small area from a certain service area (0) of a certain fixed base station (200a) to a certain service area (1) in another fixed base station (200b). The mobile base station (100) has a function of carrying out a radio communication with the fixed base stations (200a, 200b) using the small area in which the plurality of terminals (301 to 30n) exist as a service area, in the case of carrying out a radio communication with the plurality of terminals (301 to 30n). Further, the mobile base station (100) can move in the same direction in which the plurality of terminals (301 to 30n) move.

Further, the present invention relates to a structure of a base station in an existing mobile communication network on the ground. Particularly, the base station (200) has been conventionally fixed to a certain point on the ground or has been fixed relative to the ground surface. The base station (200) takes a form of having a base station function in a stationary satellite, for example. The present invention relates to a structure of a base station (100) that moves together with terminals (301) that collectively move in the same direction, in addition to the fixed base station (200).

Further, the present invention relates to a hand-over processing method that is used when a certain terminal (301), existing within an area (hereinafter to be referred to as a service area) (0) to which a wave from a certain base station (200a) reaches, moves to a service area (1) of another base station (200b), The invention also relates to a hand-over processing method that is used when a certain terminal (301), existing within one service area (0) of a plurality of service areas served by a certain base station (200) (in this case, there are a plurality of service areas as the areas served by the base station (200) are divided in various sectors depending on directions), moves to another service area (1) within the same bass station (200).

Particularly, the invention relates to a hand-over processing method for collectively carrying out a hand-over processing of terminals (301) as one unit when the terminals (301) within a service area (0) of a certain base station (200a) move together in the same direction to a service area (1) of another base station (200b).

Further, the invention relates to a hand-over processing method for collectively carrying out a hand-over processing of terminals (301) as one unit when the terminals (301) within one service area (0) of a plurality of service areas served by a certain base station (200) move together in the same direction to another service area (1) of the same base station (200).

According to the present invention, a mobile base station (100) that moves together with a plurality of terminals (301) of a certain group is installed within a mobile communication network, separate from a conventionally fixed base station (200). For example, terminals (301) within an airplane are moving together to the same direction. The mobile base station (100) in the present invention is installed within this airplane. One or more mobile base stations (100) may be installed within one airplane. When it becomes necessary to carry out a hand-over during a period while the mobile base station (100) is communicating with the base station (200) or exchange fixed on the ground, the mobile base station (100) collectively carries out a hand-over processing of the terminals (301) within the service area (10) of the mobile base station (100), through communications with the base station (200) or exchange fixed on the ground.

DETAILED DESCRIPTION OF THE PREFERRED EMBODIMENTS

A first embodiment of a base station apparatus according to the present invention will be explained below with reference to FIG. 2 to FIG. 4.

Figure 1:
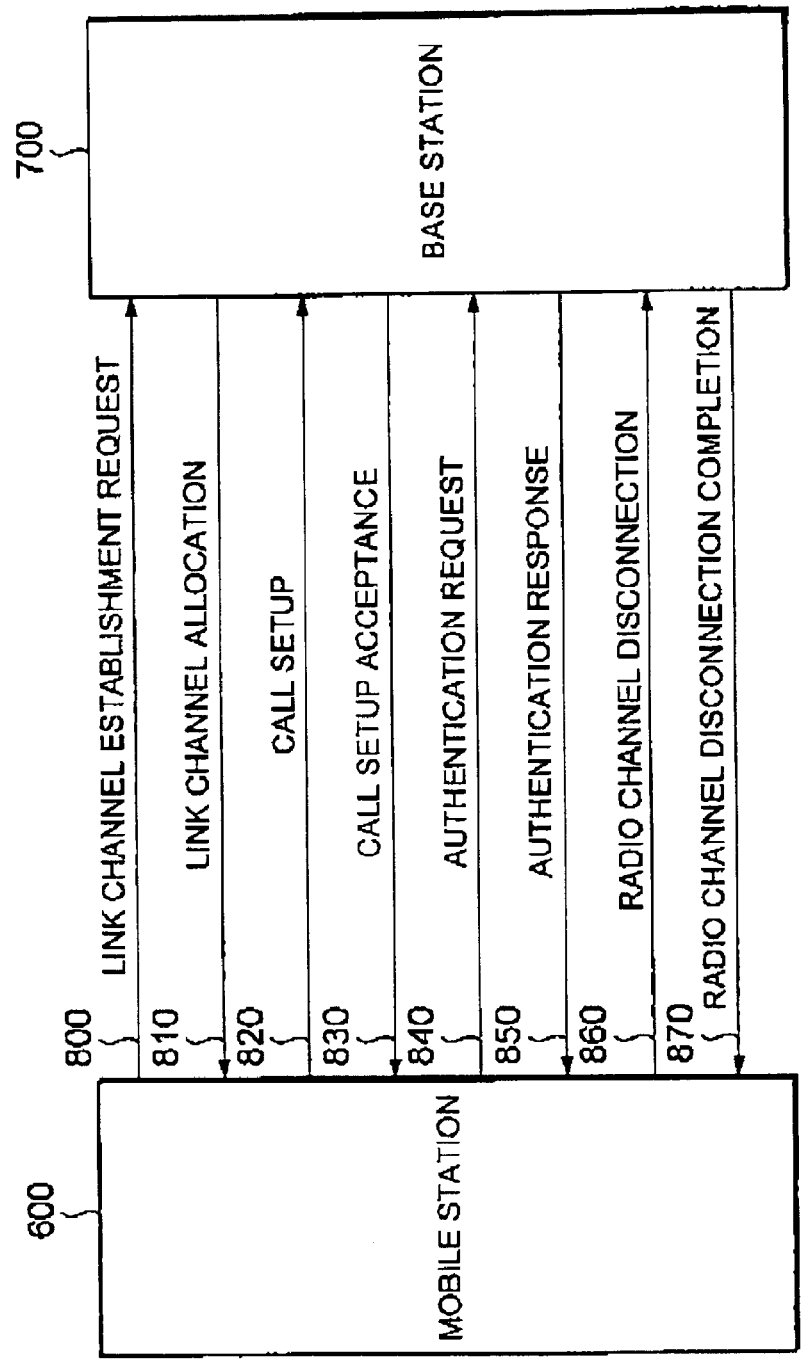
FIG. 1 is a diagram showing a conventional sequence of hand-over messages between a mobile base station and a fixed base station.
Figure 2:
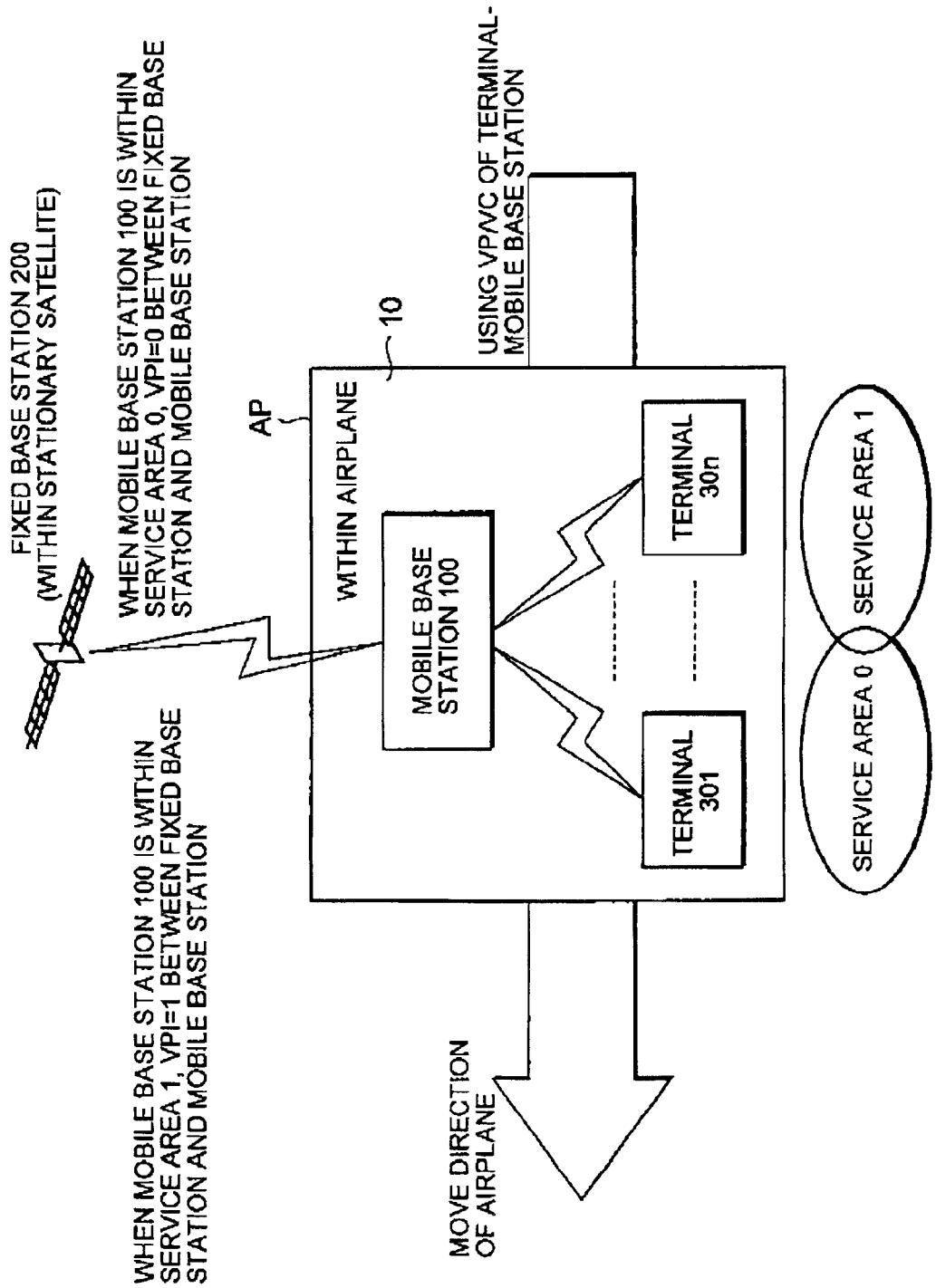
FIG. 2 is a diagram showing a total structure of a first embodiment of the present invention.

Referring to FIG. 2, a fixed base station 200 is installed within a stationary satellite. In the above mobile communication network, a base station fixedly installed on the ground may be used in place of the fixed base station installed within the stationary satellite.

The stationary satellite is irradiating one or more radio beams toward the ground surface. In FIG. 2, a radio beam irradiation area 0 and a radio beam irradiation area 1 are shown as the areas into which the radio beams are irradiated. One radio beam irradiation area corresponds to one service area.

One or more terminals exist within each service area. It is presumed that one or more terminals 301 to 30n exist within an airplane AP.

According to the present embodiment, in addition to the fixed base station 200, another base station is installed within the airplane AP. This base station is installed within a physical space of the transporting means AP that moves at a high speed like a train and an airplane carrying many passengers, and this base station is called a mobile base station 100. The mobile base station 100 is fixedly installed within the airplane AP. The mobile base station 100 moves relative to the fixed base station 200 based on a move of the airplane AP.

In order to simplify the explanation, it is assumed that one mobile base station 100 exists within one airplane AP. A plurality of mobile base stations 100 can also exist within one airplane AP. When a plurality of mobile base stations 100 exist within one airplane AP, the structure and operation of each mobile base station 100 are substantially the same as those of the mobile base station 100 when one mobile bass station 100 exists within the airplane AP.

The mobile base station 100 covers the entire cabin 10 of the airplane AP as a service area.

Inside the cabin 10, n terminals 301 to 30n exist. The terminals 301 to 30n are notebook-type personal computers, and internal cable telephones installed at the seats inside the cabin 10.

The mobile base stations 100 communicate with each of the plurality of terminals 301 to 30n by radio or by wire inside the cabin 10.

The mobile base station 100 communicates by radio with the stationary satellite in the sky. Further, the mobile base station 100 communicates by radio with a fixed base station or a fixed exchange installed at a certain location like the fixed base station 200 or an exchange (not shown) installed within a base station on the ground or within the stationary satellite.

The ATM (asynchronous transfer mode) is used as a data transfer system between the terminals 301 to 30n and the mobile base station 100, and between the mobile base station 100 and the fixed base station 200 (within the stationary satellite).

Figure 3:
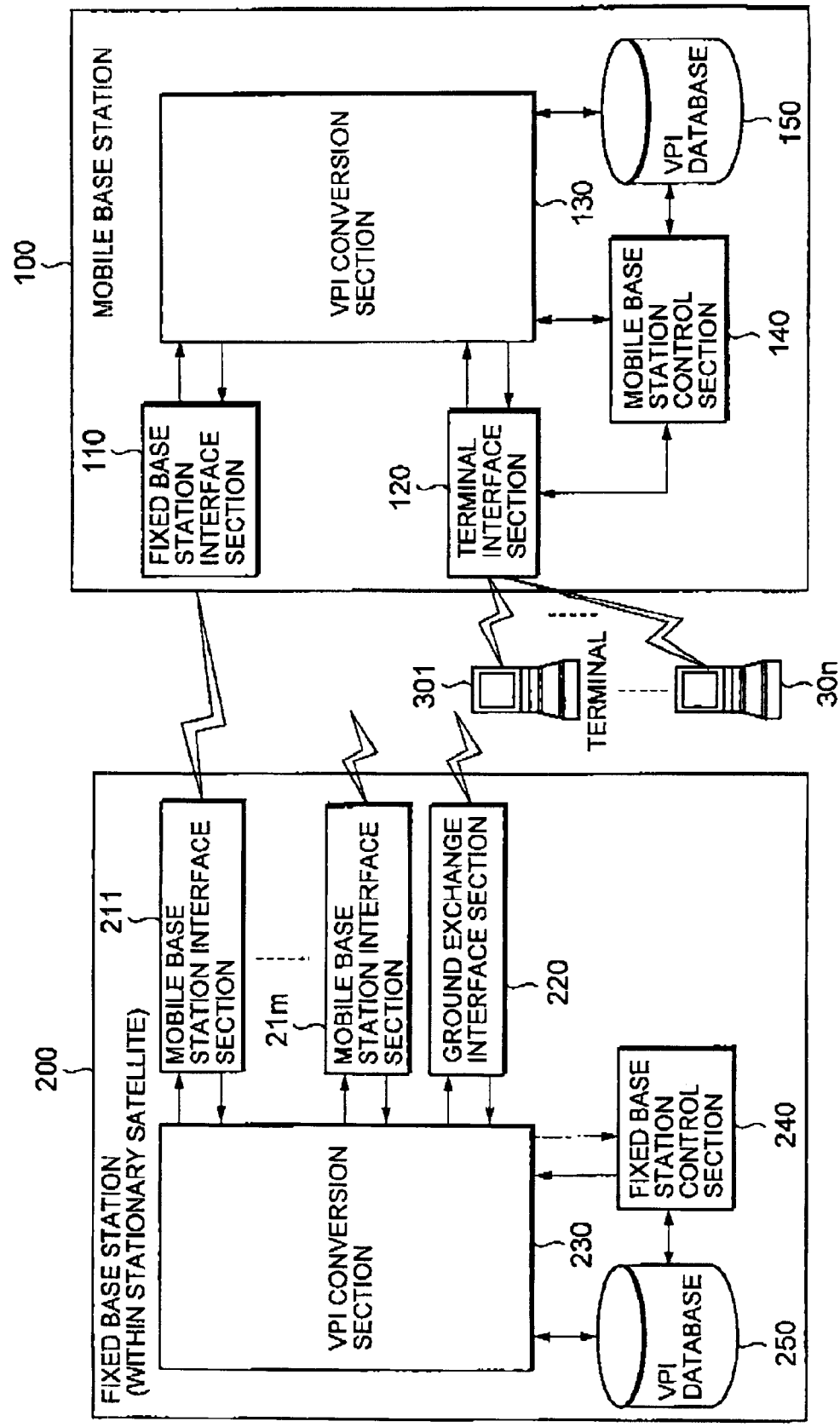
FIG. 3 is a block diagram showing a structure of a mobile base station and a fixed base station within a stationary satellite according to the first embodiment of the present invention.

FIG. 3 shows a structure of the mobile base station 100 and the fixed base station 200. The internal circuit configuration of the mobile base station 100 will be explained first.

The mobile base station 100 is equipped with a fixed base station interface section 110, a terminal interface section 120, a VPI conversion section 130, a mobile base station control section 140, and a VPI database 150.

The fixed base station interface section 110 is an interface of the mobile base station with the fixed base station 200. The fixed base station interface section 110 is equipped with an antenna for transmitting/receiving waves, a transmission/reception LSI for transmitting/receiving radio data, and a control LSI for controlling the transmission/reception LSI.

The terminal interface section 120 is an interface of the mobile base station with the terminals 301 to 30n. When the terminals 301 to 30n communicate by radio with the mobile base station 100, the terminal interface section 120 is equipped with an antenna for transmitting/receiving waves, a radio data transmission/reception LSI for transmitting/receiving radio data, and a control LSI for controlling the radio data transmission/reception LSI. When the terminals 301 to 30n communicate by wire with the mobile base station 100, the terminal interface section 120 is equipped with a wire data transmission/reception LSI for transmitting/receiving wire data, and a control LSI for controlling the wire data transmission/reception LSI.

The VPI conversion section 130 rewrites (converts) a header portion (VPI: virtual path identifier) of an ATM cell.

The mobile base station control section 140 controls the mobile base station 100 itself, and executes a hand-over processing. The mobile base station control section 140 also sets data and erases data of the VPI database 150.

The VPI database 150 stores VPI information before a conversion, and VPI information after a conversion corresponding to the VPI information before the conversion.

The internal circuit configuration of the fixed base station 200 within the stationary satellite will be explained next.

The fixed base station 200 is equipped with a plurality (m) of mobile base station interface sections 211 to 21m, a ground exchange interface section 220, a VPI conversion section 230, a fixed base station control section 240, and a VPI database 250.

The plurality of mobile base station interface sections 211 to 21m have substantially the same structures with each other. The mobile base station interface section 211 is an interface of the fixed base station with the mobile base station 100. The mobile base station interface section 211 is equipped with an antenna for transmitting/receiving waves, a radio data transmission/reception LSI for transmitting/receiving radio data, and a control LSI for controlling the radio data transmission/reception LSI.

The ground exchange interface section 220 is an interface of the fixed base station with an exchange (not shown) on the ground. The ground exchange interface section 220 as equipped with an antenna for transmitting/receiving waves when the ground exchange and the fixed base station 200 carry out a radio communication, a radio data transmission/reception LSI for transmitting/receiving radio data, and a control LSI for controlling the radio data transmission/reception LSI.

The VPI conversion section 230 rewrites (converts) a header portion (VPI) of an ATM cell.

The fixed base station control section 240 controls the fixed base station 200 itself, and executes a hand-over processing. The fixed base station control section 240 also sets data and erases data of the VPI database 250.

The VPI database 250 stores VPI information before a conversion, and VPI information after a conversion corresponding to the VPI information before the conversion.

Hand-over Operation

The hand-over operation In the present embodiment will be explained next. A series of operation will be briefly explained below.

It is assumed that a person having a mobile terminal 301 including a portable telephone and a PHS is on board the airplane AP that is mounted with the mobile base station 100. In this case, the mobile terminal 301 executes a hand-over processing, and the management of this mobile terminal 301 is shifted from a fixed base station installed within the airport facilities or a fixed base station installed near the airport to the mobile base station 100 inside the cabin 10.

The fixed base station 200 manages a plurality of mobile base stations 100. The fixed base station 200 gives a unique identifier (a mobile base station identifier) to each of the plurality of mobile base stations 100. The mobile base station identifier is an identifier for uniquely identifying each of the plurality of mobile base stations 100 in the mobile communication system of the present embodiment. In other words, one mobile base station corresponds to one mobile base station identifier. When control messages are exchanged between the fixed base station 200 and the mobile base station 100, the mobile base station identifier is used as information for indicating a destination of each control message. The control messages include messages exchanged during the hand-over processing (see a radio link channel changeover request message 400 shown in FIG. 4).

The control message contains information necessary for identifying the control message itself in addition to the mobile base station identifier. When a control message is transmitted, a predetermined VPI (virtual path identifier) and a predetermined VCI (virtual channel identifier) are used. Whether an ATM cell contains a control message or not can be judged from values of the VPI/VCI. In other words, values of the VPI/VCI that indicate a message during the hand-over processing are determined in advance. Therefore, whether an ATM cell contains a message to be exchanged during the hand-over processing or not can be judged based on the values of the VPI/VCI contained in the ATM cell. According to the ATM communication system, VCIs that the users can use have been defined by the ITU-T recommendation. The users cannot use 0 to 32 for the VCI. There is no limit to values for the VPI. According to the present embodiment, among the VPI/VCI that the users can use, VPI/VCI for the control messages of the mobile communication system of the present embodiment have been determined in advance. Each device of the present embodiment can identify whether the ATM cell contains a control message or user data from only the VPI/VCI.

The mobile base station 100 receives the ATM cells from the terminal 301 via the terminal interface section 120. In the mobile base station 100, the VPI conversion section 130 converts the VPI of the ATM cells received from the terminal 301 into a VPI for between the mobile base station 100 and the fixed base station 200. Then, the mobile base station 100 transmits the ATM cells to the fixed base station 200 via the fixed base station interface section 110.

However, there is also a case where the VPI before the conversion is the same as the VPI after the conversion.

When the airplane AP equipped with the mobile base station 100 has started a move, at the fixed base station 200 side, it looks that the mobile base station 100 inside the cabin 10 has started a move along with the move of the airplane AP. This situation is shown in FIG. 2. FIG. 4 shows an outline of exchanges of messages between the mobile base station 100 and the fixed base station 200 during a hand-over processing.

A certain connection made while the airplane AP equipped with the mobile base station 100 is moving from the radio beam irradiation area 0 (the service area 0) to the radio beam irradiation area 1 (the service area 1), as shown in FIG. 2, will be explained.

In this connection, it is assumed that VPI=0 is used in the ATM cells between the terminal 301 and the mobile base station 100 in the radio beam irradiation area 0, and that VPI=0 is used also in the ATM cells between the mobile base station 100 and the fixed base station 200.

When the airplane AP reaches near the boundary between the two radio beam irradiation areas 0 and 1, the mobile base station 100 starts a hand-over processing.

Figure 4:
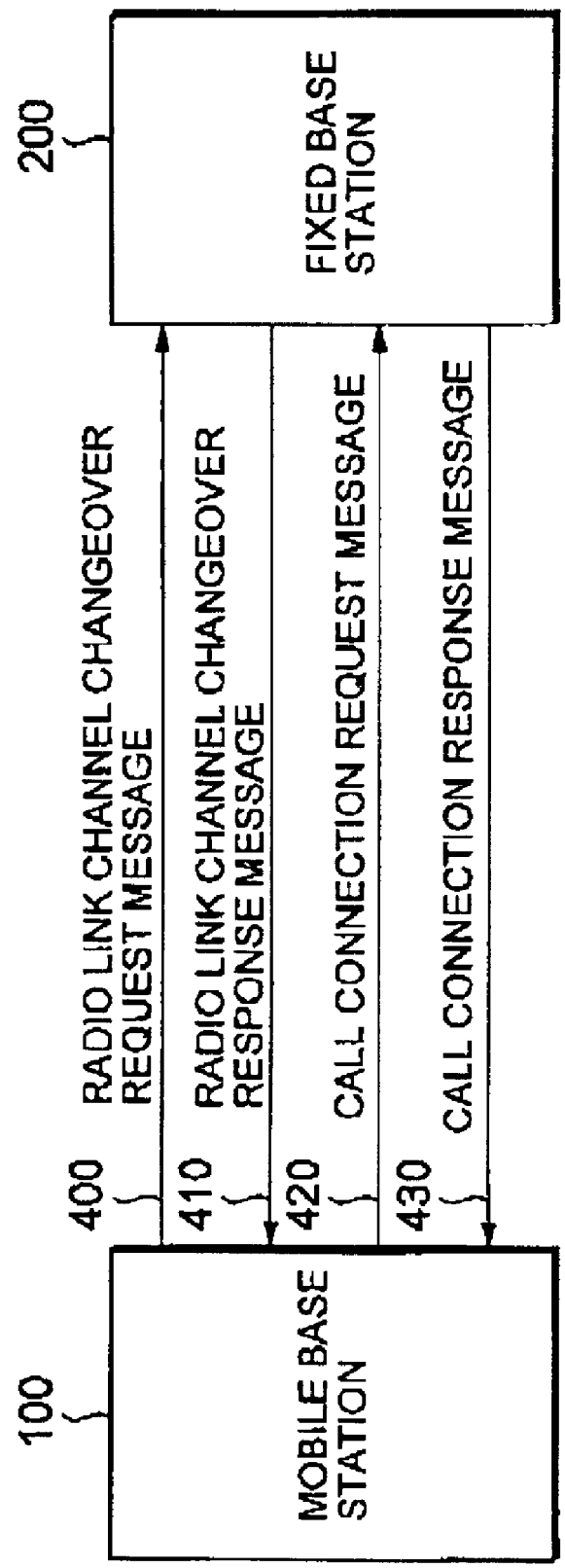
FIG. 4 is a diagram showing a sequence of hand-over messages between the mobile base station and the fixed base station according to the first embodiment of the present invention.

As shown in FIG. 4, when the mobile base station 100 has started the hand-over processing, the mobile base station 100 transmits the radio link channel changeover request message 400 to the fixed base station 200 by using the radio channel within the radio beams currently being used.

The radio link channel changeover request message 400 includes a mobile base station identifier of this mobile base station 100, and information of the hand-over destination (the radio beam irradiation area 1, in this case). When necessary, the radio link channel changeover request message 400 also includes other control messages.

The information of the hand-over destination is information that specifies the hand-over destination. This is the information (a radio beam number) indicating a radio frequency that is used in the service area of the hand-over destination. In place of the radio beam number, the information of the hand-over destination may be a service area number when service area numbers 0 to p (p denotes the number of all service areas that are provided in the stationary satellite communication in the present embodiment) have been allocated to the service areas in advance to uniquely specify each service area.

When the TDMA (time-division multiple access) system has been employed as a radio transmission system, the radio link channel changeover request message 400 further includes a radio channel number that is used between the mobile base station 100 and the fixed base station 200, and a TDMA slot number on this radio channel, in addition to the above information.

The fixed base station 200 that has received the radio link channel changeover request message 400 identifies a service area of the hand-over destination based on the radio link channel changeover request message 400. Further, the fixed base station 200 allocates a radio transmission capacity equivalent to the radio transmission capacity that is used by the mobile base station 100 before the hand-over.

When the TDMA system is being used, the fixed base station 200 allocates the same number of radio channels as those used between the mobile base station 100 and the fixed base station 200, and the same number of TDMA slots as those used by the mobile base station 100 on those radio channels.

When the allocation of the radio transmission capacity has been completed, the fixed base station 200 transmits a radio link channel changeover response message 410 to the mobile base station 100.

The radio link channel changeover response message 410 includes a result of the allocation processing of the radio transmission capacity.

When the allocation has been successful in the case of the TDMA system being employed, the radio link channel changeover response message 410 includes new radio channel numbers allocated by the fixed base station 200, and TDMA slot numbers on the new radio channels. When the allocation has been unsuccessful, a result of a failure is notified as the radio link channel changeover response message 410.

When the radio link channel changeover processing has been a failure, the hand-over processing becomes a failure. In this case, the mobile base station 100 can repeat the same processing until the processing becomes successful or can repeat the processing by a plurality of times within a limited number, so long as the mobile base station 100 is within the service area 0.

When the mobile base station 100 has not been successful in the radio link channel changeover processing while the mobile base station 100 is within the service area 0, a failure of the hand-over processing becomes determinate. As a result, the terminals 301 to 30n under the management of the mobile base station 100 will become unable to communicate at a point of time when the mobile base station 100 has moved out of the service area 0.

When the mobile base station 100 has been successful in the radio link channel changeover processing, the mobile base station 100 carries out a call setup processing. The mobile base station 100 transmits a call connection request message 420 to the fixed base station 200.

The call connection request message 420 includes the VPI information (VPI=0 in the present embodiment, as described above) that the mobile base station 100 exchanges between the fixed base station 200 and the mobile base station 100 in the service area 0.

The fixed base station 200 that has received the call connection request message 420 identifies a transmission band used in the VP (virtual path), based on the VPI information that is being used in the service area 0 by the mobile base station 100 that has transmitted this call connection request message 420. Then, the fixed base station 200 allocates this transmission band to the mobile base station 100 in the service area 1.

Further, the fixed base station 200 allocates a new VPI (VPI=1) to be used in the service area 1 to this mobile base station 100.

When the band allocation processing has been completed, the fixed base station 200 transmits a call connection response message 430 to the mobile base station 100. The call connection response message 430 includes a result of the band allocation processing. When the allocation has been successful, the call connection response message 430 includes the VPI to be used in the service area 1. In the example of FIG. 2, VPI=1 is allocated as the new VPI. When the allocation has been unsuccessful, a result of a failure is notified as the call connection response message 430.

When the call connection processing has been a failure, the hand-over processing becomes a failure. In this case, the mobile base station 100 can repeat the same processing until the processing becomes successful or can repeat the processing by a plurality of times within a limited number, so long as the mobile base station 100 is within the service area 0. When the mobile base station 100 has not been successful in the call connection processing while the mobile base station 100 is within the service area 0, a failure of the hand-over processing becomes determinate. As a result, the terminals 301 to 30n under the management of the mobile base station 100 will become unable to communicate at a point of time when the mobile base station 100 has moved out of the service area 0.

When the mobile base station 100 has been successful in the call connection processing, the mobile base station 100 updates the contents of the VPI data that is being managed within the mobile base station 100, according to the VPI=1 notified from the fixed base station 200. When this update processing has been completed, the VPI that is being used between this mobile base station 100 and the fixed base station 200 changes from the VPI=0 to the VPI=1.

The radio beams that have been used in the service area 0 are also changed over to the radio beams that are to be used in the service area 1.

In the manner as described above, the terminals 301 to 30n under the management of the mobile base station 100 are handed over from the radio irradiation area 0 to the radio irradiation area 1.

The operation of each functional block within the mobile base station 100 and each functional block within the fixed base station 200 when the hand-over processing is executed will be explained next.

As shown in FIG. 3, the fixed base station interface section 110 is monitoring a reception status of the radio channel currently being used. The fixed base station interface section 110 outputs a used-channel reception status signal that indicates a reception status of this radio channel to the mobile base station control section 140 periodically or each time when the reception status of the radio channel has changed.

Each time when the used-channel reception status signal has been input from the fixed base station interface section 110, the mobile base station control section 140 makes a decision as to whether it is necessary to carry out a hand-over processing at this point of time or not.

Further, the fixed base station interface section 110 is also monitoring a reception status of one or more radio channels separate from the radio channel currently being used. The fixed base station interface section 110 outputs an unused-channel reception status signal that indicates a reception status of these radio channels to the mobile base station control section 140 periodically or each time when the reception status of any of the radio channels has changed.

When the mobile base station 100 has reached near the boundary between the service area 0 and the service area 1, the mobile base station control section 140 detects that a reception status of the radio channel near the service area 0 has become worse, based on the used-channel reception status signal input from the fixed base station interface section 110.

The mobile base station control section 140 holds a certain threshold value for the reception status of the radio channel. When a reception status of the radio channel at this point of time indicated by the used-channel reception status signal is worse than the threshold value, the mobile base station control section 140 starts the hand-over processing.

The mobile base station control section 140 selects a radio channel in the best reception status at present from among the radio channels other than the radio channel currently being used based on the unused-channel reception status signal, and determines this radio channel as the hand-over destination.

The above threshold value is set when the mobile base station 100 is manufactured.

The threshold value can also be set from a test terminal that has been connected to the mobile base station 100 at the time of testing the operation of the mobile base station 100, instead of setting this threshold value at the time of the manufacture of the mobile base station 100.

Alternatively, the threshold value can also be set based on a radio communication that is carried out at a location away from the mobile base station 100 by using a control message addressed to the mobile base station control section 140.

In the mobile base station 100 that has started the hand-over processing, the mobile base station control section 140 generates a radio link channel changeover request message 400, and maps this radio link channel changeover request message 400 to one or more ATM cells. The mobile base station 100 then transmits the mapped ATM cells to the fixed base station 200 through the VPI conversion section 130 and the fixed base station interface section 110.

The VPI conversion section 130 output the ATM cells received from the mobile base station control section 140 to the fixed base station interface section 110. In this case, the VPI conversion section 130 may carry out a VPI conversion processing.

The fixed base station interface section 110 that has received the ATM cells from the VPI conversion section 130 transmits the ATM cells to the fixed base station 200 when the time of transmitting the data to the fixed base station 200 has come. For example, the fixed base station interface section 110 transmits the ATM cells to the fixed base station 200 when a TDMA slot allocated to this mobile base station 100 has arrived in the case of the TDMA system being employed.

The mobile base station interface section 211 of the fixed base station 200 that has received one or more ATM cells to which the radio link channel changeover request message 400 was mapped outputs the received ATM cells and a base station interface identifier to the VPI conversion section 230.

The base station interface identifier is information for uniquely identifying one or more mobile base station interface sections 211 to 21m held by the fixed base station 200.

One mobile base station interface section 211 has one or more base station interface identifiers. The number of the base station interface identifiers is equal to the number of mobile base stations 100 that the mobile base station interface section 211 can accommodate.

The mobile base station interface section 211 allocates a unique base station interface identifier to each of the mobile base stations 100 under management to identify these mobile base stations 100.

The base station interface identifier is information that is used only within the mobile base station interface section 211. As described above, one mobile base station interface section 211 accommodates one or more mobile base stations 100. For example, when the TDMA communication is carried out, communication slots are allocated to the mobile base stations 100 on a slot basis. When there is no base station interface identifier while a certain mobile base station interface section 211 is communicating by radio with a plurality of mobile base stations 100, this mobile base station interface section 211 needs to avoid any duplication in the setting of VPI/VCI to the ATM cells that are used between the mobile base station interface section 211 and these mobile base stations 100. When the setting of the VPI/VCI to the ATM cells involves any duplication, it becomes impossible to identify destined mobile base stations 100 of the ATM cells and originating mobile base stations 100 of the ATM cells.

As the mobile base stations 100 move, the period during which the base station interface identifier of a certain value is being assigned to a certain mobile base station 100 is limited. When this mobile base station 100 has become unable to communicate by radio with the mobile base station interface section 211, the base station interface identifier that has been set to this mobile base station 100 is released. This base station interface identifier can be used for a new separate mobile base station 100.

The VPI conversion section 230 knows that the received ATM cells are to be output to the fixed base station control section 240, based on the values of the VPI/VCT of the received ATM cells and an input port number of the VPI conversion section 230. As described above, as certain predetermined VPI/VCI values are used for the control message, it is possible to identify whether the data is the control message or the user data, based on only the VPI/VCI data.

The VPI conversion section 230 outputs the ATM cells and the base station interface identifier received from the mobile base station interface section 211 to the fixed base station control section 240. The input port number refers to a number of an input port of the VPI conversion section 230 to which the mobile base station interface section 211 is connected.

The fixed base station control section 240 extracts data from one or more ATM cells that have been received, and prepares the radio link channel changeover request message 400. At the time of preparing this radio link channel changeover request message 400, there is a case where ATM cells that include other messages like a radio link channel changeover request message are received from a plurality of mobile base stations. Therefore, the fixed base station control section 240 prepares the message from the received ATM cells for each base station interface identifier.

The fixed base station control section 240 that has received the radio link channel changeover request message 400 identifies a service area of a hand-over destination, based on the received radio link channel changeover request message 400. Further, the fixed base station control section 240 allocates a radio transmission capacity of the same capacity as that of the radio transmission capacity that has been used by this mobile base station 100 before the hand-over.

When the TDMA system has been used, the fixed base station control section 240 allocates the same number of radio channels as the radio channels used between the mobile base station 100 and the fixed base station 200 and the number of TDMA slots on the radio channels.

When the allocation of the radio transmission capacity has been completed, the fixed base station 200 maps the radio link channel changeover response message 410 to one or more ATM cells, and transmits these ATM cells and the base station interface identifier to the mobile base station interface section 211 through the VPI conversion section 230, for transmission to the mobile base station 100.

The radio link channel changeover response message 410 includes a result of the allocation processing of allocating the radio transmission capacity. When the allocation has been successful in tie case of the TDMA system being employed, the radio link channel changeover response message 410 includes new radio channel numbers allocated by the fixed base station 200, and TDMA slot numbers on the new radio channels. When the allocation has been unsuccessful, a result of a failure is notified as the radio link channel changeover response message 410.

When the radio link channel changeover processing has been a failure, the hand-over processing becomes a failure. In this case, the fixed base station control section 240 transmits the radio link channel changeover response message 410 that indicates a result of the failure. Thereafter, the fixed base station control section 240 suspends the radio link channel changeover processing of the mobile base station 100 until the fixed base station control section 240 receives a new radio link channel changeover request message 400 from the mobile base station 100. When the fixed base station control section 240 has received other messages like the radio link channel changeover request message 400 from other mobile base stations, the fixed base station control section 240 processes the received messages.

The VPI conversion section 230 knows a mobile base station interface section to which the received ATM cells are to be output out of the plurality of mobile base station interface sections 211 to 21m, from the VPI/VCI values of the ATM cells received from the fixed base station control section 240 and the input port number. The VPI conversion section 230 outputs the ATM cells and the base station interface identifier received from the fixed base station control section 240 to the mobile base station interface section 211 to which the received ATM cells are to be output.

The mobile base station interface section 211 that has received the ATM cells and the base station interface identifier identifies the mobile base station 100 to which the output is to be made, from the base station interface identifier. When a time for transmitting the data to this mobile base station 100 has come (that is, when the TDMA slot allocated to this mobile base station 100 has arrived in the case of the TDMA system being used) the mobile base station interface section 211 transmits the ATM cells to this mobile base station 100.

The fixed base station interface section 110 of the mobile base station 100 that has received the ATM cells outputs the received ATM cells to the VPI conversion section 130.

The VPI conversion section 130 knows that the received ATM cells are to be output to the mobile base station control section 140, based on the values of the VPI/VCI of the received ATM cells and the input port number of the ATM cells. The VPI conversion section 130 outputs the ATM cells to the mobile base station control section 140.

The mobile base station control section 140 extracts data from one or more ATM cells that have been received, and prepares the radio link channel changeover response message 410.

When the radio link channel changeover processing has been a failure, the mobile base station 100 can repeat the radio link channel changeover processing until the processing becomes successful or can repeat the processing by a plurality of times within a limited number, so long as the mobile base station 100 is within the service area 0. When the mobile base station 100 has not been successful in the radio link channel changeover processing while the mobile base station 100 is within the service area 0, a failure of the hand-over processing becomes determinate. As a result, the terminals 301 to 30*n* under the management of the mobile base station 100 will become unable to communicate at a point of time when the mobile base station 100 has moved out of the service area 0.

When the radio link channel changeover processing of only one or more terminals corresponding to a part of the plurality of terminals 301 to 30*n* has been unsuccessful, it is possible to carry out the radio link channel changeover processing for only the unsuccessful terminals.

When the radio link channel changeover processing has been successful, that is, when the mobile base station control section 140 has received information of the new radio link channel in the radio link changeover response message 410, the mobile base station control section 140 carries out a call setup processing.

First, the mobile base station control section 140 maps the call connection request message 420 to one or more ATM cells, and then transmits the mapped ATM cells to the fixed base station 200 through the VPI conversion section 130 and the fixed base station interface section 110. The call connection request message 420 includes the VPI information that is used between the mobile base station 100 and the fixed base station 200 in the service area 0.

The mobile base station interface section 211 of the fixed base station 200 that has received the one or more ATM cells to which the call connection request message 420 was mapped outputs the received ATM cells and the base station interface identifier to the VPI conversion section 230.

The VPI conversion section 230 knows that the received ATM cells are to be output to the fixed base station control section 240, based on the values of the received VPI/VCI and the input port number of the VPI conversion section 230. The VPI conversion section 230 outputs the ATM cells and the base station interface identifier received from the mobile base station interface section 211 to the fixed base station control section 240.

The fixed base station control section 240 extracts data from one or more ATM cells that have been received, and prepares the call connection request message 420. At the time of preparing this call connection request message 420, there is a case where ATM cells that include other messages like the call connection request message 420 are received from a plurality of mobile base stations. Therefore, the fixed base station control section 240 prepares the message from the received ATM cells for each base station interface identifier.

The fixed base station control section 240 identifies a transmission band that is being used in the VP, based on the VPI information received from the mobile base station 100 that has transmitted the call connection request message 420. The fixed base station control section 240 allocates the sane band as the transmission band that is being used by the mobile base station in the service area 0, to the mobile base station 100. Further, the fixed base station control section 240 allocates a new VPI to be used in the service area 1, to the mobile base station 100.

When the band allocation processing has been completed, the fixed base station control section 240 maps the call connection response message 430 to one or more ATM cells. Then, the fixed base station control section 240 transmits the ATM cells and the base station interface identifier to the mobile base station 100 through the VPI conversion section 230 and the mobile base station interface section 211.

The call connection response message 430 includes a result of the above band allocation processing. When the allocation has been successful, the call connection response message 430 includes the VPI to be used in the service area 1. In the example shown in FIG. 2, the VPI=1 is newly allocated. When the allocation has been unsuccessful, a result of a failure is notified as the call connection response message 430.

When the call connection processing has been a failure, the hand-over processing becomes a failure. In this case, the fixed base station control section 240 transmits the call connection response message 430. Thereafter, the fixed base station control section 240 suspends the call connection processing of the mobile base station 100 until the fixed base station control section 240 receives a new call connection request message 420 from the mobile base station 100. When the fixed base station control section 240 has received other messages like the call connection from other mobile base stations 100, the fixed base station control section 240 processes the received messages.

The VPI conversion section 230 knows a mobile base station interface section 211 to which the received ATM cells are to be output out of the plurality of mobile base station interface sections 211 to 21*m*, based on the VPI/VCI values of the ATM cells received from the fixed base station control section 240 and the input port number. The VPI conversion section 230 outputs the ATM cells and the base station interface identifier received from the fixed base station control section 240 to the mobile base station interface section 211.

The mobile base station interface section 211 that has received the ATM cells and the base station interface identifier identifies the mobile base station 100 to which the output is to be made, from the received base station interface identifier. When a time for transmitting the data to this mobile base station 100 has come (that is, when the TDMA slot allocated to this mobile base station 100 has arrived in the case of the TDMA system being used), the mobile base station interface section 211 transmits the ATM cells to this mobile base station 100.

The fixed base station interface section 110 of the mobile base station 100 that has received the ATM cells outputs the received ATM cells to the VPI conversion section 130.

The VPI conversion section 130 knows that the received ATM cells are to be output to the mobile base station control section 140, based on the values of the VPI/VCI of the received ATM cells and the input port number of the ATM cells. The VPI conversion section 130 outputs the ATM cells to the mobile base station control section 140.

The mobile base station control section 140 extracts data from one or more ATM cells that have been received, and prepares the call connection response message 430.

When the call connection processing has been a failure, the mobile base station 100 can repeat the call connection processing until the processing becomes successful or can repeat the processing by a plurality of times within a limited number, so long as the mobile base station 100 is within the service area 0.

When the mobile base station 100 has not been successful in the call connection processing while the mobile base station 100 is within the service area 0, a failure of the hand-over processing becomes determinate. As a result, the terminals 301 to 30n under the management of the mobile base station 100 will become unable to communicate at a point of time when the mobile base station 100 has moved out of the service area 0. When the call connection processing of only one or more terminals corresponding to a part of the plurality of terminals 301 to 30n has been unsuccessful, it is possible to carry out the call connection processing for only the unsuccessful terminals.

When the mobile base station 100 has been successful in the call connection processing, the mobile base station control section 140 updates the contents of the VPI data of the VPI database 150 according to the VPI notified from the fixed bass station 200. When this update processing has been completed, the VPI that is being used between this mobile base station 100 and the fixed base station 200 changes from VPI=0 to VPI=1.

When the mobile base station control section 140 has notified to the mobile base station interface section 211 the radio beam information notified by the radio channel changeover processing, the radio beams used in the service area 0 is changed over to the radio beams to be used in the service area 1.

In the manner as described above, the mobile base station 100 according to the present embodiment can execute the hand-over processing of the terminals 301 to 30n under the management of the mobile base station 100, without making each of the terminals 301 to 30n execute the hand-over processing. Further, the mobile base station 100 can hand over the plurality of terminals 301 to 30n all at once.

As explained above, according to the first embodiment, there is provided the mobile base station 100 that moves together with the plurality of terminals 301 to 30n forming a certain group. When the terminals 301 to 30n within a certain service area 0 among a plurality of service areas served by a certain fixed base station 200 move together in the same direction into another service area 1 served by the same fixed base station 200, the mobile base station 100 can collectively carry out the hand-over processing for all the terminals 301 to 30n as a group. As a result, it is possible to decrease the control information volume during the hand-over processing.

According to the first embodiment, the transmission of data including both the control information and the user data is carried out by the ATM communication system. In the ATM communication system, data exchanges between the transmitter and the receiver are carried out using a single data format called ATM cell. Therefore, unlike the conventional system, it is not necessary to distinguish between a radio channel for transmitting the control information (CCH: control channel) and a radio channel for transmitting the user data (TCH: traffic channel). As a result, the radio channel conventionally used for the control channel (CCH) can be used as the radio channel for the user data (TCH). According to the present embodiment using the ATM communication system, it is possible to effectively utilize the limited radio band.

Modification

Next, a modification of the first embodiment will be explained.

In a satellite communication system, there is a radio beam irradiation system in which one radio beam covers a plurality of service areas by sequentially changing irradiation areas of a certain radio beam. This is called a scanning spot beam system.

The hand-over processing by the mobile base station 100 in the present invention does not depend on radio beam irradiation systems. Therefore, when the scanning spot beam system is employed as the radio beam irradiation system, it is also possible to realize the hand-over processing by the mobile base station 100 according to the present invention without any substantial change in the contents described in the first embodiment. With regard to the hand-over processing by the fixed base station 200 within the stationary satellite and the mobile base station 100, there is no particular difference between the first embodiment and this case.

SECOND EMBODIMENT

A second embodiment of the present invention will be explained next.

In the first embodiment and its modification, a description has been made of a case where the hand-over processing is carried out between the service areas under a certain stationary satellite. In order to support the whole areas on the earth by using the stationary satellite communication system, for example, at least three or four stationary satellites are necessary. The second embodiment relates to a hand-over processing that is carried out by the mobile base station 100 between a plurality of stationary satellites.

Figure 5:
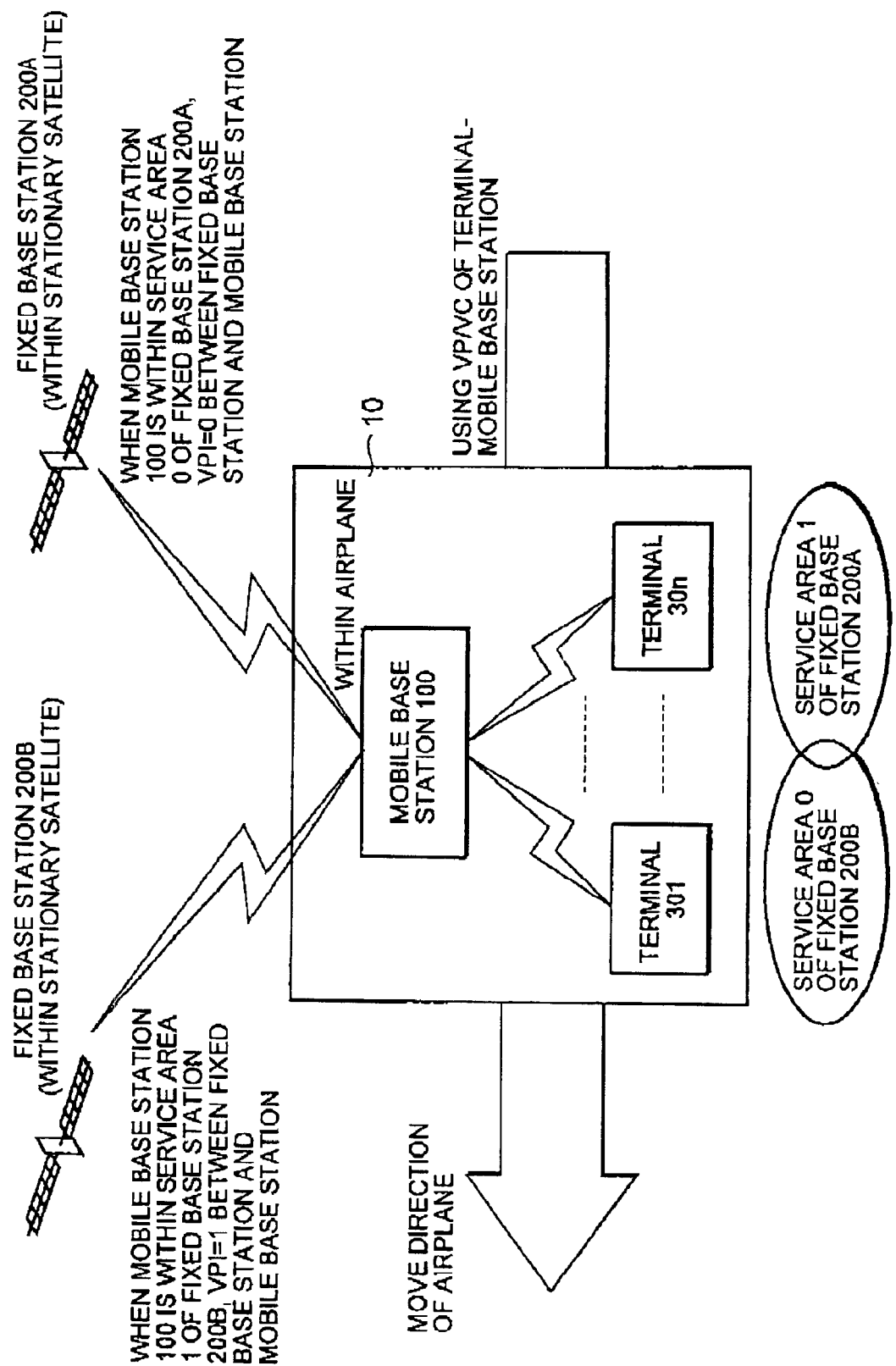
FIG. 5 is a diagram showing a total structure of a second embodiment of the present invention.
Figure 6:
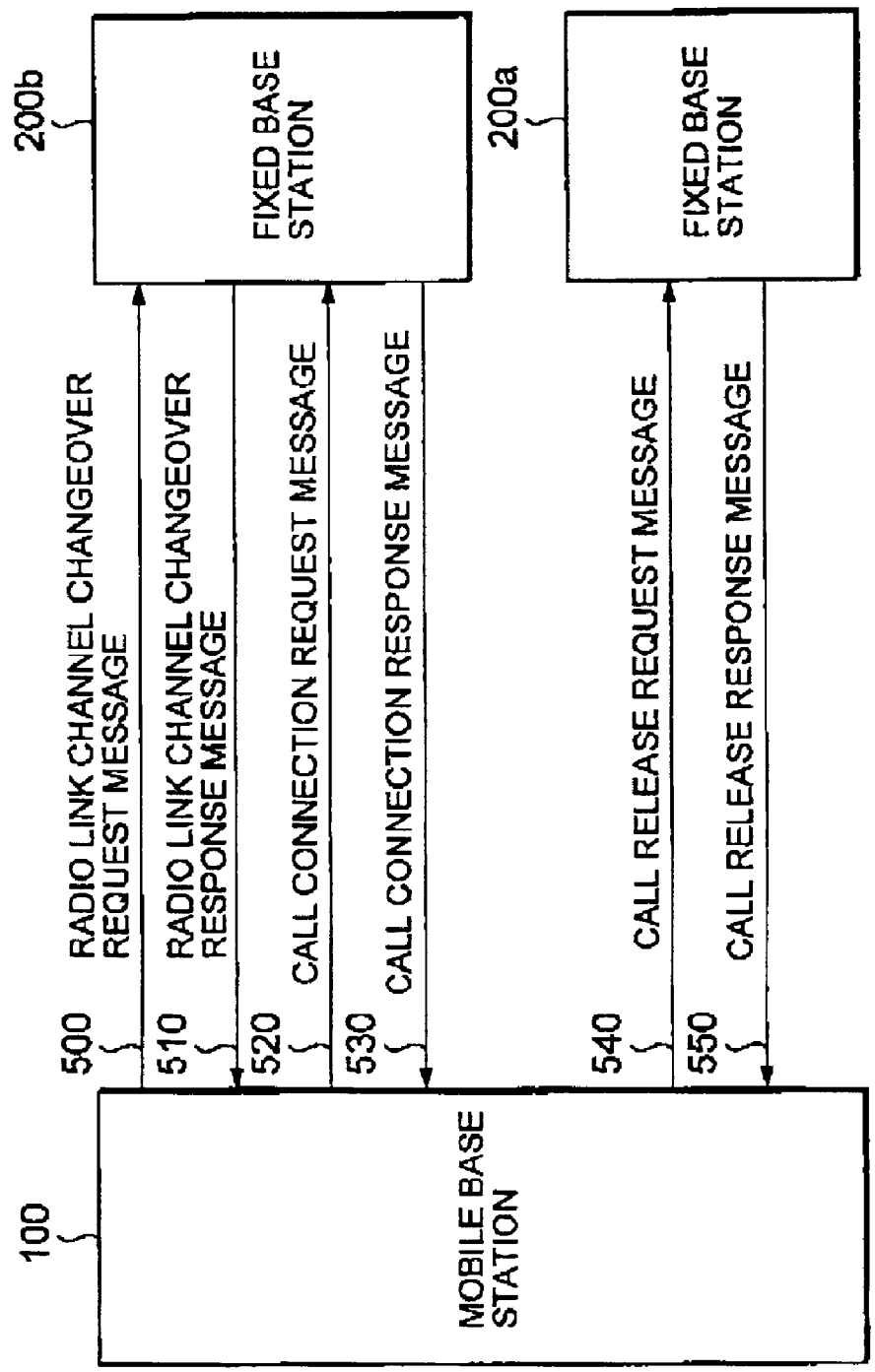
FIG. 6 is a diagram showing a sequence of hand-over messages between the mobile base station and the fixed base station according to the second embodiment of the present invention.

FIG. 5 is a diagram showing a total structure of the second embodiment. FIG. 6 shows a hand-over processing of the second embodiment. There is no substantial difference in the method of processing messages of the hand-over within the mobile base station 100, between the first and second embodiments. Therefore, only different points will be explained.

As shown in FIG. 5, a fixed base station 200a within a stationary satellite provides a service area 0, and another fixed base station 200b within another stationary satellite provides a service area 1. A mobile base station 100 carries out a hand over from the service area 0 to the service area 1.

As shown in FIG. 6, when the mobile base station 100 has started a hand-over processing, the mobile base station 100 transmits a radio link channel changeover request message 500 to the fixed base station 200b by using a radio channel within the radio beams currently used.

A radio link channel changeover request message 500 includes a mobile base station identifier of this mobile base station 100, and information of the hand-over destination (the radio beam irradiation area 1, in this case). When necessary, the radio link channel changeover request message 500 also includes other control messages.

The information of the hand-over destination has the same meaning as that in the above-described first embodiment.

When the TDMA system has been employed as a radio transmission system, the radio link channel changeover request message 500 further includes a radio channel number that is used between the mobile base station 100 and the fixed base station 200b, and a TDMA slot number on this radio channel, in addition to the above information.

The fixed base station 200b that has received the radio link channel changeover request message 500 identifies a service area of the hand-over destination based on the radio link channel changeover request message 500. Further, the fixed base station 200b allocates a radio transmission capacity equivalent to the radio transmission capacity that is used by the mobile base station 100 before the hand-over.

When the TDMA system is being used, the fixed base station 200b allocates the same number of radio channels as the radio channels used between the mobile base station 100 and the fixed base station 200a, and the same number of TDMA slots as the TDMA slots used by the mobile base station 100 on those radio channels.

When the allocation of the radio transmission capacity has been completed, the fixed base station 200b transmits a radio link channel changeover response message 510 to the mobile base station 100.

The radio link channel changeover response message 510 includes a result of the allocation processing of the radio transmission capacity.

When the allocation has been successful in the case of the TDMA system being employed, the radio link channel changeover response message 510 includes new radio channel numbers allocated by the fixed base station 200b, and TDMA slot numbers on the new radio channels. When the allocation has been unsuccessful, a result of a failure is notified as the radio link channel changeover response message 510.

When the radio link channel changeover processing has been a failure, the hand-over processing becomes a failure. In this case, the mobile base station 100 can repeat the same processing until the processing becomes successful or can repeat the processing by a plurality of times within a limited number, so long as the mobile base station 100 is within the service area 0.

When the mobile base station 100 has not been successful in the radio link channel changeover processing while the mobile base station 100 is within the service area 0, a failure of the hand-over processing becomes determinate. As a result, terminals 301 to 30n under the management of the mobile base station 100 will become unable to communicate at a point of time when the mobile base station 100 has moved out of the service area 0.

When the mobile base station 100 has been successful in the radio link channel changeover processing, the mobile base station 100 carries out a call setup processing. The mobile base station 100 transmits a call connection request message 520 to the fixed bass station 200b.

The call connection request message 520 includes the VPI information (VPI=0 in the present embodiment, as described above) that the mobile base station 100 exchanges between the fixed base station 200a and the mobile base station 100 in the service area 0.

The fixed base station 200b that has received the call connection request message 520 identifies a transmission band used in the VP (virtual path), based on the VPI information that is being used in the service area 0 by the mobile base station 100 that has transmitted this call connection request message 520. Then, the fixed base station 200b allocates this transmission band to the mobile base station 100 in the service area 1.

Further, the fixed base station 200b allocates a new VPI (VPI=1) to be used in the service area 1 to this mobile base station 100.

When the band allocation processing has been completed, the fixed base station 200b transmits a call connection response message 530 to the mobile base station 100. The call connection response message 530 includes a result of the band allocation processing. When the allocation has been successful, the call connection response message 530 includes the VPT to be used in the service area 1. In the example of FIG. 5, VPI=1 is allocated as the new VPI. When the allocation has been unsuccessful, a result of a failure is notified as the call connection response message 530.

When the call connection processing has been a failure, the hand-over processing becomes a failure. In this case, the mobile base station 100 can repeat the same processing until the processing becomes successful or can repeat the processing by a plurality of times within a limited number, so long as the mobile base station 100 is within the service area 0. When the mobile base station 100 has not been successful in the call connection processing while the mobile base station 100 is within the service area 0, a failure of the hand-over processing becomes determinate. As a result, the terminals 301 to 30n under the management of the mobile base station 100 will become unable to communicate at a point of time when the mobile base station 100 has moved out of the service area 0.

When the mobile base station 100 has been successful in the call connection processing, the mobile base station 100 updates the contents of the VPI data that is being managed within the mobile base station 100, according to the VPI=1 notified from the fixed base station 200b. When this update processing has been completed, the VPI that is being used between this mobile base station 100 and the fixed base station 200b changes from VPI=0 to VPI=1.

The radio beams that have been used in the service area 0 are also changed over to the radio beams that are to be used in the service area 1.

In the manner as described above, the terminals 301 to 30n under the management of the mobile base station 100 are handed over from the radio irradiation area 0 to the radio irradiation area 1.

The mobile base station 100 carries out the hand-over processing with the fixed base station 200b of the hand-over destination by using the same messages of the hand-over through the control radio channel. When the mobile base station 100 transmits the message 520 for the call connection processing, the message 520 for the call connection processing includes transmission band information to be used in each VPI as new information. The fixed base station 200b carries out the band allocation processing based on the requested transmission band information When the hand-over processing between the fixed base station 200b of the hand-over destination and the mobile base station 100 has been finished, the mobile base station 100 transmits a call release request message 540 to the fixed base station 200a before the hand-over. The call release request message 540 is mapped to one or more ATM cells, and the mapped ATM cells are transmitted to the fixed base station 200a through a VPI conversion section 130 and a fixed base station interface section 110.

The call release request message 540 includes the VPI information (VPI=0) that is being used between the fixed base station 200a and the mobile base station 100 in the service area 0 that is provided to the mobile base station 100 by the fixed base station 200a. A fixed base station control section 240 of the fixed base station 200a receives the call release request message 540 in a similar manner to that of receiving other messages.

The fixed base station control section 240 of the fixed base station 200a that has received the call release request message 540 releases all the setting of the requested VPI, and generates a call release response message 550. This call release response message 550 includes a result of the release processing of the requested VPI. The fixed base station control section 240 of the fixed base station 200a transmits the call release response message 550 to the mobile base station 100 in a similar manner to that of transmitting other messages.

A mobile base station control section 140 that has received the call release response message 550 releases all the setting before the hand-over, and finishes the call release processing with the fixed base station 200a before the hand-over.

The hand-over processing is carried out among a plurality of stationary satellites in the manner as described above.

As explained above, according to the second embodiment, there is provided the mobile base station 100 that moves together with the plurality of terminals 301 to 30n forming a certain group. When the terminals 301 to 30n within a service area 0 served by a certain fixed base station 200a move together in the same direction into another service area 1 served by a separate fixed base station 200b, the mobile base station 100 can collectively carry out the hand-over processing for all the terminals 301 to 30n as a group. As a result, it is possible to decrease the control information volume during the hand-over processing.

According to the second embodiment, the transmission of data including both the control information and the user data is carried out by the ATM communication system, like in the first embodiment. In the ATM communication system, data exchanges between the transmitter and the receiver are carried out using a single data format called ATM cell. Therefore, unlike the conventional system, it is not necessary to distinguish between a radio channel for transmitting the control information (CCH: control channel) and a radio channel for transmitting the user data (TCH: traffic channel). As a result, the radio channel conventionally used for the control channel (CCH) can be used as the radio channel for the user data (TCH). According to the present embodiment using the ATM communication system, it is possible to effectively utilize the limited radio band.

As explained above, according to the present invention, it is possible to decrease the control information volume during the hand-over processing.

What is claimed is:

1. A base station apparatus for communicating with a specific base station and at least one terminal that is movable relative to the specific base station, wherein
the base station apparatus is movable relative to the specific base station, and when the at least one terminal has moved relative to the specific base station, the base station apparatus moves relative to the specific base station substantially in the same direction as a move direction of the at least one terminal, and
the base station apparatus communicates with the specific base station and the terminal respectively according to an ATM (asynchronous transfer mode) communication system in which user data and control information are allocated to at least one ATM cell without distinction between the user data and the control information.

2. The base station apparatus according to claim 1, wherein
the user data is data that is transmitted through a traffic channel, and
the control information is information that is transmitted through a control channel.

3. The base station apparatus according to claim 1, wherein, when the base station apparatus communicates with the specific base station and the terminal, respectively, unique VPI (virtual path identifier) and VCI (virtual channel identifier) are allocated to the at least one ATM cell that includes the control information, the VPI and VCI indicating that the at least one ATM cell includes the control information.

4. The base station apparatus according to claim 1, comprising:
a specific base station interface section for performing radio communication with the specific base station, wherein the specific base station interface section produces a used-channel reception status signal that indicates a reception status of a channel that is being used between the specific base station and the base station apparatus and an unused-channel reception status signal that indicates a reception status of a second channel different from the channel that is being used; and
a base station control section determines whether a hand-over is to be carried out or not, based on the used-channel reception status signal and the unused-channel reception status signal which are input from the specific base station interface section, wherein, when it is determined that the hand-over is to be carried out, the base station control section selects a service area to which the hand-over is to be carried out.

5. The base station apparatus according to claim 4, further comprising:
a terminal interface section;
a VPI conversion section; and
a VPI database section for storing VPI data,
wherein
the specific base station interface section extracts an ATM cell as a first ATM cell from a reception frame received from the specific base station, outputs the first ATM cell to the VPI conversion section, maps an ATM cell input from the VPI conversion section into a transmission frame as a second ATM cell, and transmits the transmission frame to the specific base station,
the terminal interface section communicates with the terminal, extracts an ATM cell as a third ATM cell from a reception frame received from the terminal, outputs the third ATM cell to the VPI conversion section, maps an ATM cell input from the VPI conversion section into a transmission frame as a fourth ATM cell, and transmits the transmission frame to the terminal,
the VPI conversion section refers to the VPI data stored in the VPI database, converts the VPI data of the input first ATM cell and outputs a result to the terminal interface section, converts the VPI data of the input third ATM cell and outputs a result to the fixed base station interface section, and
the mobile base station control section outputs the converted VPI data to the VPI database.

6. The base station apparatus according to claim 1, wherein, when the terminal moves from a first service area to a second service area of the specific base station, the base station apparatus carries out hand-over processing of the terminal on behalf of the terminal.

7. The base station apparatus according to claim 6, wherein, when a plurality of terminals move from the first service area to the second service area, the base station apparatus carries out hand-over processing of the plurality of terminals as one unit.

8. The base station apparatus according to claim 6, wherein the base station apparatus communicates with a plurality of specific base stations and, when the terminal moves from a first service area of a first specific base station among the plurality of specific base stations to a second service area of a second specific base station among the plurality of specific base stations, the base station apparatus carries out a hand-over processing of the terminal on behalf of the terminal.

9. The base station apparatus according to claim 1, wherein the base station apparatus communicates with a plurality of specific base stations and, when the terminal moves from a first service area of a first specific base station among the plurality of specific base stations to a second service area of a second specific base station among the plurality of specific base stations, the base station apparatus carries out a hand-over processing of the terminal on behalf of the terminal.

10. The base station apparatus according to claim 9, wherein, when a plurality of terminals move from the first service area to the second service area, the base station apparatus carries out hand-over processing of the plurality of terminals as one unit.

11. The base station apparatus according to claim 1, wherein the base station apparatus is installed in transporting means for transporting a user of a terminal.

12. The base station apparatus according to claim 1, wherein the specific base station is fixedly provided on the ground.

13. The base station apparatus according to claim 1, wherein, when the terminal moves from a first service area to a second service area of the specific base station, the base station apparatus carries out hand-over processing of the terminal on behalf of the terminal.

14. The base station apparatus according to claim 1, wherein the base station apparatus communicates with a plurality of specific base stations and, when the terminal moves from a first service area of a first specific base station among the plurality of specific base stations to a second service area of a second specific base station among the plurality of specific base stations, the base station apparatus carries out a hand-over processing of the terminal on behalf of the terminal.

15. The base station apparatus according to claim 1, wherein the specific base station is fixed relative to the ground surface.

16. A communication system comprising:

a specific base station;

a terminal that is movable relative to the specific base station; and a base station apparatus for communicating with the specific base station and the terminal, wherein the base station apparatus is movable relative to the specific base station, and when the terminal has moved relative to the specific base station, the base station apparatus moves relative to the specific base station substantially in the same direction as a move direction of the terminal, wherein the base station apparatus communicates with the specific base station and the terminal respectively according to an ATM (asynchronous transfer mode) communication system in which user data and control information are allocated to ATM cells without distinction between the user data and the control information.

17. The communication system according to claim 16, wherein, when the base station apparatus communicates with the specific base station and the terminal, respectively, unique VPI and VCI are allocated to the ATM cells that include the control information, the VPI and VCI indicating that the ATM cells include the control information.

18. The communication system according to claim 16, wherein the base station apparatus comprises:

a specific base station interface section; and a base station control section, wherein the specific base station interface section carries out a radio communication with the specific base station, generates a used-channel reception status signal that indicates a reception status of a channel that is being used between the specific base station and the base station apparatus and an unused-channel reception status signal that indicates a reception status of a second channel different from the channel that is being used, and outputs these signals to the base station control section, and the base station control section determines whether a hand-over is to be carried out or not, based on the used-channel reception status signal and the unused-channel reception status signal, and selects a service area to which the hand-over is to be carried out when it is determined that the hand-over is to be carried out.

19. The communication system according to claim 18, wherein the base station apparatus further comprises:

a terminal interface section;

a VPI conversion section; and a VPI database section for storing VPI data, wherein the specific base station interface section extracts ATM cells from a reception frame received from the specific base station as first ATM cells, outputs the first ATM cells to the VPI conversion section, maps ATM cells input from the VPI conversion section into a transmission frame as second ATM cells, and transmits the transmission frame to the specific base station, the terminal interface section communicates with the terminal, extracts ATM cells from a reception frame received from the terminal as third ATM cells, outputs the third ATM cells to the VPI conversion section, maps ATM cells input from the VPI conversion section into a transmission frame as fourth ATM cells, and transmits the transmission frame to the terminal, the VPI conversion section refers to the VPI data stored in the VPI database section, converts the VPI data of the input first ATM cells and outputs a result to the terminal interface section, converts the VPI data of the input third ATM cells and outputs a result to the fixed base station interface section, and the mobile base station control section outputs the converted VPI data to the VPI database section.

20. The communication system according to claim 16, wherein, when the terminal moves from a first service area to a second service area of the specific base station, the base station apparatus carries out a hand-over processing of the terminal on behalf of the terminal.

21. The communication system according to claim 20, wherein the base station apparatus communicates with a plurality of specific base stations and, when the terminal moves from a first service area of a first specific base station among the plurality of specific base stations to a second service area of a second specific base station among the plurality of specific base stations, the base station apparatus carries out a hand-over processing of the terminal on behalf of the terminal.

22. The communication system according to claim 16,
wherein the base station apparatus communicates with a plurality of specific base stations and, when the terminal moves from a first service area of a first specific base station among the plurality of specific base stations to a second service area of a second specific base station among the plurality of specific base stations, the base station apparatus carries out a hand-over processing of the terminal on behalf of the terminal.

23. The communication system according to claim 16,
wherein, when a plurality of terminals move from the first service area to the second service area, the base station apparatus collectively carries out a hand-over processing of the plurality of terminals as one unit.

24. The communication system according to claim 16, wherein the base station apparatus is installed in transporting means that transports a user of the terminal.

25. The communication system according to claim 16, wherein the specific base station is fixedly provided on the ground or is fixed relative to the ground surface.

26. The communication system according to claim 16, wherein, when the terminal moves from a first service area to a second service area of the specific base station, the base station apparatus carries out a hand-over processing of the terminal on behalf of the terminal.

27. The communication system according to claim 16, wherein the base station apparatus communicates with a plurality of specific base stations and, when the terminal moves from a first service area of a first specific base station among the plurality of specific base stations to a second service area of a second specific base station among the plurality of specific base stations, the base station apparatus carries out a hand-over processing of the terminal on behalf of the terminal.

28. The communication system according to claim 16, wherein, when a plurality of terminals move from the first service area to the second service area, the base station apparatus collectively carries out a hand-over processing of the plurality of terminals as one unit.

29. The communication system according to claim 16, wherein the specific base station is fixed relative to the ground surface.

30. A communication method comprising the steps of:
(a) providing first and second service areas by a first base station;
(b) providing a second base station having a third service area;
(c) providing the second base station so that the third service area is superimposed on the first service area;
(d) when a plurality of terminals move from the first service area to the second service area, moving the second base station so that the third service area covers the moved plurality of terminals;
at the second base station,
(e) collectively generating first data required for a hand-over processing associated with movement of the plurality of terminals from the first service area to the second service area, on behalf of the plurality of terminals, to output the generated first data to the first base station; and
at the first base station,
(f) collectively generating for the plurality of terminals second data necessary for the hand-over processing of the plurality of terminals in response to the input first data to output the generated second data to the second base station.

31. The communication method according to claim 30, wherein
at step (e), the second base station outputs the generated first data in ATM (asynchronous transfer mode), and
at step (f), the first base station outputs the generated second data to the second base station in the ATM.

32. The communication method according to claim 30, wherein the hand-over processing is carried out only between the first terminal and the second terminal on behalf of the plurality of terminals.

* * * * *